A. L. FOLGER.
Sorghum Evaporator.
No. 65,738.
Patented June 11, 1867.
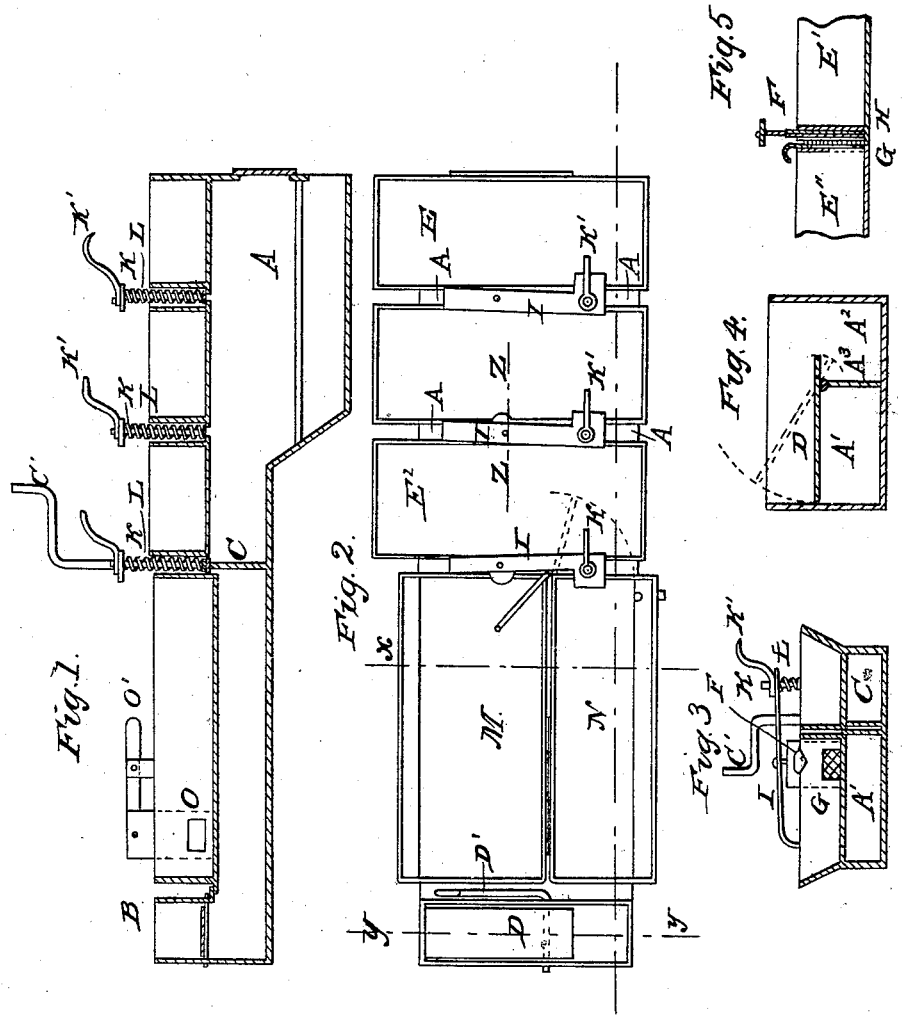

United States Patent Office.

ADDISON L. FOLGER, OF SUMNER, INDIANA.

Letters Patent No. 65,738, dated June 11, 1867.

IMPROVED SORGHUM-EVAPORATOR.

The Schedule referred to in these Letters Patent and making part of the same.

TO ALL WHOM IT MAY CONCERN:

Be it known that I, A. L. FOLGER, of Sumner, in the county of Rush, and State of Indiana, have invented a new and useful improvement in Sorghum-Evaporators; and I do hereby declare that the following is a full, clear, and exact description of the same, reference being had to the annexed drawings, making part of this specification, in which—

Figure 1 is a vertical longitudinal section.
Figure 2 is a plan.
Figure 3 is a section on the line $x\ x$, fig. 2.
Figure 4 is a a section on the line $y\ y$.
Figure 5 is a section on the line $z\ z$.

The same letters are employed in all the figures in the indication of the same parts.

A is the furnace, constructed with a fire-chamber and grate-bars under the transverse pans, and being divided into two flues, $A^1$ and $A^2$, by a longitudinal vertical partition, $A^3$, extending from the fire-chamber back to the chimney at B. These flues $A^1$ and $A^2$ are respectively closed in whole or in part by dampers C and D, actuated by the crank $C^1$ and rod $D^1$. Over the fire-chamber I place a series of flaring pans, E $E^1$ $E^2$, set transversely across the furnace, and having one end overhanging the side of the furnace for convenience in skimming on one side, as the ebullition of the juice in the pans will throw the scum to this colder end of the pan. Gateways are constructed in the series of transverse pans, through which the juice placed in the pan E will flow successively into all the other pans in the series. I have shown three, but this number is not fixed. These gateways are closed by gates F and screens G. The screens are formed with a metallic rim and covered with wire gauze or a foraminated plate. The bottom of the rim will prevent the passage of sedimentary matter from one pan to another, and the screens will stop the light floating impurities. The connection between the pans is formed by the flanges H H bolted to the outside of the pans on each side of the gateway, and connected by a packing of sheet copper or other suitable material placed between them at H'. This packing projects in a fin between the flanges into the gateway to form a guide for the gates and screens. The gates are attached by stems to the levers or springs I, which being attached to the pans on one side of the gates, are carried over the same and secured to the rods K, on which they slide up and down as actuated by the downward pressure of the nuts K' and the upward pressure of the spiral springs L. Behind the transverse pans are placed two longitudinal pans M and N. The pans E, $E^1$, $E^2$, and M, are on one level, the pan N is a little lower, and the juice after flowing through all the other pans is drawn into the pan N through a gate, O, actuated by a lever, O'. The preparation of the sirup is completed in the pan N, from which it is drawn in a finished state.

The pan M is placed over the flue $A^1$, and the pan N over the flue $A^2$. The damper C regulates or entirely cuts off the draught under the pan N. In like manner the damper D regulates or entirely cuts off the draught under the pan M, and by means of these two dampers the application of heat to these finishing-pans is placed entirely within the discretionary control of the operator, a power that is essential to the perfect direction of the manufacture.

What I claim as my invention, and desire to secure by Letters Patent, is—

1. The combination of the furnace A, having a longitudinal partition, $A^3$, the transverse overhung pans E $E^1$ $E^2$, and longitudinal pans M and N, substantially as described.

2. The furnace A, constructed with double flues $A^1$ and $A^2$, which are independently regulated by means of the dampers C and D, arranged to operate in relation to the pans M and N substantially as described.

3. The arrangement of the pans E $E^1$ $E^2$, gates F, screen G, lever I, rod K, nut K', and springs L, substantially as described.

4. The arrangement of the transverse and longitudinal pans, with flanges H H, intermediate plate H', and gates F, and screens G, substantially as set forth.

In testimony whereof I have signed my name to this specification in the presence of two subscribing witnesses.

ADDISON L. FOLGER.

Witnesses:
   DAVID E. BARNARD,
   GEORGE W. STARBRECK.